United States Patent [19]

Hinzmann et al.

[11] Patent Number: 6,099,772
[45] Date of Patent: Aug. 8, 2000

[54] UNDERCUT SPLIT DIE

[75] Inventors: Gerd Hinzmann; Mark Haiko; Frank Ma; Allan Wilson; Keith Buckley-Golder; Robert Round, all of Mississauga, Canada

[73] Assignee: Stackpole Limited, Mississauga

[21] Appl. No.: 08/495,462

[22] PCT Filed: Nov. 24, 1993

[86] PCT No.: PCT/CA93/00505

§ 371 Date: Sep. 11, 1995

§ 102(e) Date: Sep. 11, 1995

[87] PCT Pub. No.: WO95/14567

PCT Pub. Date: Jun. 1, 1995

[51] Int. Cl.$^7$ .................................................. B29C 43/02
[52] U.S. Cl. ........................ 264/109; 264/123; 425/344; 425/352; 425/356
[58] Field of Search .................... 425/356, 352, 425/344; 264/109, 123

[56] References Cited

U.S. PATENT DOCUMENTS

| | | | |
|---|---|---|---|
| 2,561,735 | 7/1951 | Haller | 78/0.5 |
| 3,020,589 | 2/1962 | Maritano | 18/16.5 |
| 3,394,432 | 7/1968 | Laurent | 18/16 |
| 3,694,127 | 9/1972 | Takahashi et al. | 425/352 |
| 3,752,622 | 8/1973 | Viadana | 425/78 |
| 3,773,446 | 11/1973 | Borrini | 425/78 |
| 3,842,646 | 10/1974 | Kuhn | 72/354 |
| 3,891,367 | 6/1975 | Signora | 425/78 |
| 3,909,167 | 9/1975 | Signora | 425/78 |
| 4,008,021 | 2/1977 | Fedrigo et al. | 425/3 |
| 4,043,385 | 8/1977 | Petrenchik | 164/342 |
| 4,047,864 | 9/1977 | De Santis | 425/78 |
| 4,053,267 | 10/1977 | De Santis | 425/78 |
| 4,061,452 | 12/1977 | De Santis | 425/78 |
| 4,061,453 | 12/1977 | De Santis | 425/78 |
| 4,087,221 | 5/1978 | Munson et al. | 425/78 |
| 4,153,399 | 5/1979 | De Santis | 425/78 |
| 4,270,890 | 6/1981 | Ottl | 425/150 |
| 4,401,614 | 8/1983 | De Santis | 264/109 |
| 4,482,307 | 11/1984 | Schaidl et al. | 425/78 |
| 4,573,895 | 3/1986 | De Santis | 425/78 |
| 4,666,389 | 5/1987 | Relis et al. | 425/78 |
| 4,853,180 | 8/1989 | Howard | 419/66 |
| 4,923,382 | 5/1990 | Klein | 425/78 |
| 5,024,811 | 6/1991 | Hinzmann et al. | 419/66 |
| 5,043,111 | 8/1991 | Hinzmann et al. | 264/40.5 |
| 5,043,123 | 8/1991 | Gormanns et al. | 264/113 |
| 5,049,054 | 9/1991 | Schaidl et al. | 425/78 |
| 5,156,854 | 10/1992 | Yamada | 425/78 |
| 5,238,375 | 8/1993 | Hirai | 425/77 |
| 5,259,744 | 11/1993 | Take | 425/78 |
| 5,326,242 | 7/1994 | Katagiri et al. | 425/78 |
| 5,366,363 | 11/1994 | Good et al. | 425/78 |
| 5,401,153 | 3/1995 | Katagiri et al. | 425/78 |
| 5,478,225 | 12/1995 | Takeuchi et al. | 425/78 |
| 5,498,147 | 3/1996 | Katagiri et al. | 425/78 |

*Primary Examiner*—Mary Lynn Theisen
*Attorney, Agent, or Firm*—Orange Chari Pillay

[57] ABSTRACT

This invention relates to a device to compact parts with an undercut out of powder material having an upper die moveable relative a lower die, at least one upper punch associated with the upper die for relative movement therebetween, at least two lower punches associated with said lower die for relative movement therebetween, the lower punches defining a lower cavity with the lower die for filling with the powder material when the dies are in an open position, the upper die contacting the lower die in a closed position for movement of one of the lower punches towards the upper die so as to transfer the powder material towards the upper die and then to compact the powder material between the upper and lower punches with said dies in the closed position so as to produce said part; said dies moveable to an eject position for ejection of the compacted part.

29 Claims, 4 Drawing Sheets

UNDERCUT SPLIT DIE

FIELD OF INVENTION

This invention relates to presses and toolsets for producing compacted parts out of powder material. More specifically it relates to a split die toolset.

BACKGROUND OF THE INVENTION

Devices to compact parts out of powder material for sintering are well known to those persons skilled in the art. In some cases, the compacted part has an undercut which prevents removal of the part or blank from the dies by linear or axial displacement.

Tool sets with split dies are known in powder material compaction to press parts into shapes that have an undercut in the compacting direction.

For example, U.S. Pat. No. 3,773,446 teaches a device for moulding parts to be sintered by compressing powdered material held between a fixed die and moveable die. A pair of punches extending through the dies compresses the powder material. A pressure plate operated by the punch extending through the moveable die engages the moveable die and is also locked to the fixed die during the compression so as produce a part having an undercut.

U.S. Pat. No. 3,752,622 teaches a device for moulding blanks with undercut parts to be sintered by compaction of powder material.

The prior art teaches that both parts of the die are tied together while filling with a feed box that moves across the top of the dies for purpose of filling the cavity with powdered material. After compaction the upper part of the die moves away together with the top punch to eject the part.

One of the disadvantages of the known systems as referred to above relates to the fact that the upper part of the die has to be tied mechanically to the lower part of the die and the upper punch in an alternating mode, thus making a complicated tool rig necessary.

It is therefore an object of this invention to provide a device that is simpler to construct and more efficient to operate than heretofore known by the prior art.

It is another object of this invention to provide a tool system with a split die where both parts of the die remain tied to one part of the rig during the entire cycle.

In a first aspect of the invention there is provided a toolset for a powder molding machine comprising a pair of opposed die and punch sets each having a die and a punch co-operating therewith to define respective chambers, the sets being movable relative to one another from an open position in which the sets are separated, to a closed position in which the sets abut, with the chambers in closed communication to form a closed mold cavity, one of the punches being movable from a filling position, in which the respective chamber has a volume sufficient to receive a charge of powder to fill the cavity, to a transfer position in which the respective chamber has a reduced volume, movement of the punch between the filling and the transfer positions thereby transferring powder to the other of the chambers to fill the closed cavity.

In another aspect of the invention the pair of die and punch sets constitutes a first die and punch set and a second die and punch set; the one punch being a first punch of the first die and punch set, the die with which it co-operates being a first die of the first die and punch set, and the first die and punch set having, additionally, at least a second punch; and the first and second punches are slidably nested within the first die.

In still another aspect of the invention the dies and punches of the pair of die and punch sets are further movable to compaction and ejection positions, and, in each of the filling, transfer, compaction, and ejection positions each of the punches is in sliding engagement within the die with which it is co-operating.

In yet another aspect of the invention the die and punch sets are movable in a direction of reciprocation, and, in the closed position, one of the chambers is offset transversely to the direction relative to the other of the chambers.

In a further aspect of the invention, the dies and punches of the pair of die and punch sets are further movable to compaction and ejection positions, and, in each of the filling, transfer, compaction, and ejection positions each of the punches is in sliding engagement within the die with which it is co-operating.

In another aspect of the invention there is a press for compacting a part out of powder material, that press comprising: (a) first and second die and punch sets, the first set movable relative to the second set between open, closed, and ejection positions; (b) means for causing the first set to move relative to the second set; (c) the second die and punch set having a first die and a first punch engaged within the first punch for relative movement therebetween; (d) means for causing relative movement between the first punch and first die of the second die and punch set; (e) the first die and punch set having a first die and a first punch engaged within the first punch for relative movement therebetween; (f) means for causing relative movement between the first punch and the first die of the first die and punch set; (g) the first punch movable within the first die of the first die and punch set to define a first chamber; (h) the first punch movable within the first die of the second die and punch set to define a second chamber; (i) the means of (b) movable to place the die and punch sets in the closed position with the first and second chambers in communication to form a closed mold cavity, and to capture a charge of powder therein; (j) the means of (f) movable in the closed position to move the first punch of the first die and punch set to transfer powder from the first chamber to the second chamber; (k) at least two of the means of (b), (d) and (f) co-operable to move the punches within the dies in the closed position to compact the powder; and (l) the means of (b), (d) and (f) co-operable to move the die and punch sets to the ejection position for ejecting the part.

Another aspect of the invention is a method for making compacted powder parts with a toolset including a pair of die and punch sets each having a die and an associated punch engageable therewithin to define respective chambers, the method comprising the sequential steps of: (a) establishing the tool set in a position in which the chambers are in closed communication to form a closed mold cavity with a charge of powder captured therein; (b) moving one of the punches to transfer at least a portion of the charge of powder from one of the chambers to the other of the chambers; (c) compacting the charge of powder to form a part; and (d) ejecting the part.

In a final aspect of the invention, step (a) includes moving the die and punch sets together to a position in which the one chamber is offset from the other chamber and in closed communication therewith to form the closed mold cavity.

DESCRIPTION OF THE DRAWINGS

These and other objects and features of the invention shall now be described in relation to the following drawings.

PREFERRED EMBODIMENT

Figure 1:
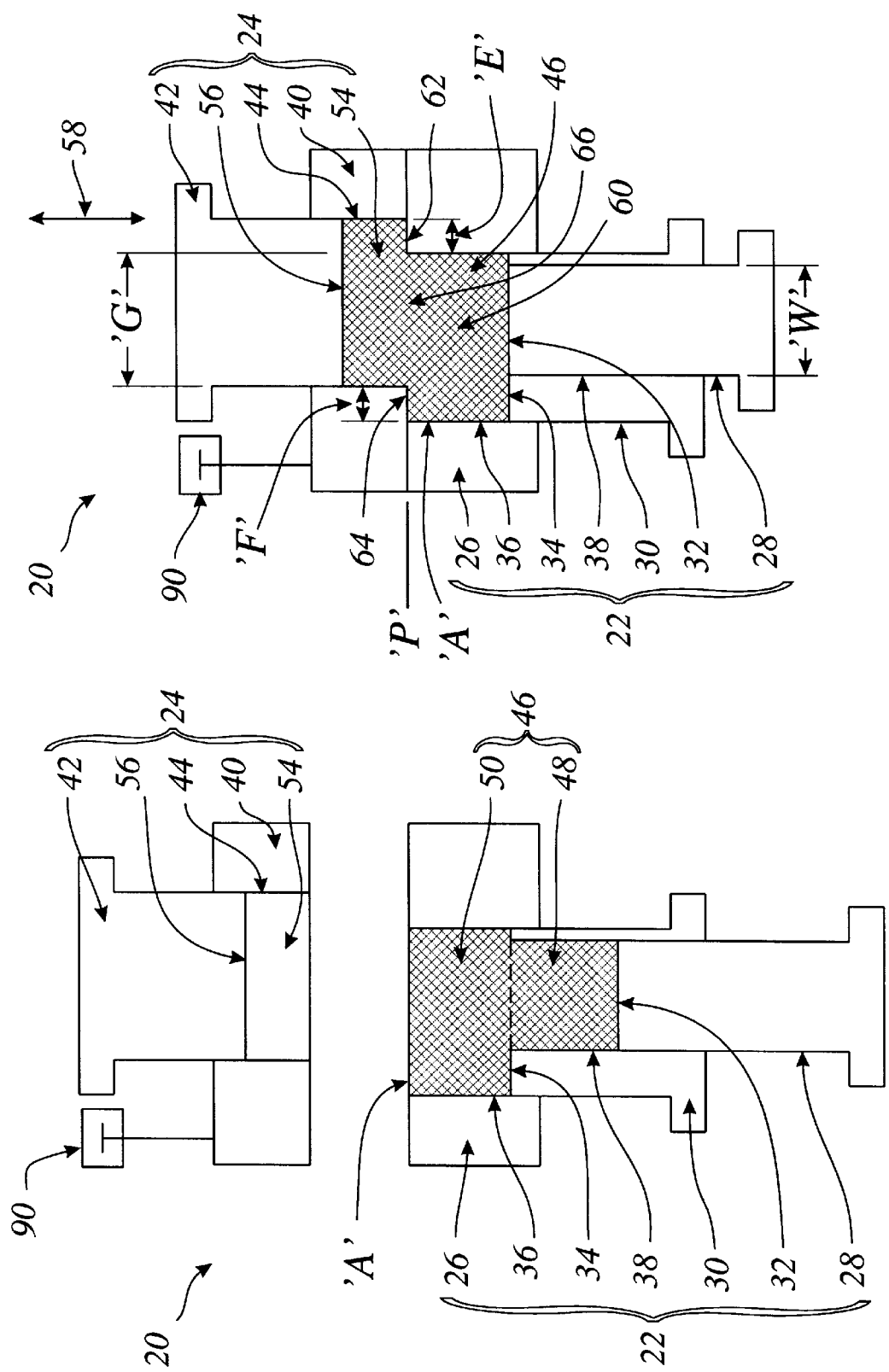
FIG. 1a shows a representative view of a toolset of an embodiment the present invention in which a toolset is shown in an open position.
FIG. 1b shows the toolset of FIG. 1a in a closed position.
FIG. 1c shows the toolset of FIGS. 1a and 1b in a compaction position.
FIG. 1d shows the toolset of FIGS. 1a, 1b, and 1c in an ejection position.

Like parts shall be given like numbers throughout the description of an embodiment of the present invention, which follows.

A toolset illustrating an embodiment of the present invention is shown in FIGS. 1a, 1b, 1c, and 1d generally as 20. It includes a pair of die and punch sets, namely a first die and punch set shown generally as 22 and a second die and punch set shown generally as 24. First die and punch set 22 includes a die 26, a first punch 28, and a second punch 30, each having distal ends 32 and 34, respectively. Die 26 has an opening 36 of a size for receiving second punch 30 in sliding engagement therewithin. Second punch 30 in turn has an opening 38 of a size for receiving first punch 28 in sliding relationship. Thus first and second punches 28 and 30 are nested within die 26, with first punch 28 nested within second punch 30. Similarly, second die and punch set 24 includes a die 40 and a punch 42, die 40 having an opening 44 for receiving punch 42 in sliding relationship.

FIG. 1a shows toolset 20 in an open position in which second die and punch set 24 is separated from first die and punch set 22. A first chamber 46 is bounded by die 26 and first and second punches 28 and 30. First chamber 46 includes a first portion 48 within opening 38 and bounded by distal end 32 of first punch 28, and a second portion 50, being the remainder of first chamber 46. A charge of powder is indicated as 'A' within first chamber 46 by cross-hatching. Similarly, a second chamber 54 of second die and punch set 24 is defined as the space between die 40 and distal end 56 of punch 42. The position shown in FIG. 1a is a filling position.

FIG. 1b shows toolset 20 in a closed position in which second die and punch set 24 has been moved relative to first die and punch set 22 in a direction indicated by arrow 58. As can be inferred from the sequential positions of FIGS. 1a, 1b, 1c, and 1d, arrow 58 indicates the direction of reciprocation of toolset 20. In the closed position of FIG. 1b die 26 of first die and punch set 22 abuts die 40 of second die and punch set 24 at a parting interface indicated as 'P'. First chamber 46 is shown in closed communication with second chamber 54 to define a closed mold cavity 60, containing the charge of powder, 'A'.

In the closed position of FIG. 1b, first punch 28 has moved relative to second punch 30 to a position in which end 32 is shown flush with end 34, thereby displacing that amount of powder formerly contained within first portion 48. The position of second punch 30 relative to die 26, and hence the size of portion 50 remains as in FIG. 1a. First chamber 46 has thus been reduced in size by the amount displaced by first punch 28 in moving from the position of FIG. 1a to the position of FIG. 1b.

Second chamber 54 is indicated, by cross hatching, as containing that portion of charge of powder 'A' not remaining in first chamber 46, transferred across interface 'P' by the displacement of first punch 28. The closed position shown in FIG. 1b is a transfer position.

As may also be seen in FIG. 1b, opening 36, and hence first chamber 46, is offset from opening 44, and hence from second chamber 54, in a direction transverse to the direction of reciprocation indicated by arrow 58. The extent of this offset is indicated, on one side, by a first undercut 62, of a dimension indicated as 'E', and on the other side by a second undercut 64, of a dimension indicated as 'F'.

In the closed position shown in FIG. 1b, first chamber 46 communicates with second chamber 54 across a gap indicated as neck 66, and having a width of dimension 'G'. Dimension 'G' is equal to the width of opening 36 less dimension 'E', or, equivalently, the width of opening 44 less dimension 'F'. Distal end 32 of first punch 28 has a width of a dimension indicated as 'W'. In the embodiment illustrated, width 'G' of neck 64 is greater than width 'W' of end 32. Also in the embodiment illustrated, first punch 32 is located opposite neck 64 and aligned therewith such that end 32 would fall within a projection of neck 64 in the direction of arrow 58.

In FIG. 1c, toolset 20 is shown in a compaction position. Chambers 46 and 54 remain in closed communication, first and second punches 28 and 30 of first die and punch set 22 and punch 42 of second die and punch set 24 have been moved toward interface 'P' within dies 26 and 40, respectively, to compact charge of powder 'A' into a compacted part indicated generally with more closely spaced cross hatching as 'B'.

In FIG. 1d, toolset 20 has been separated at parting interface 'P' to expose part 'B', which has undercuts indicted as 68 and 70 which correspond to undercuts 62 and 64 of toolset 20 described above. Toolset 17 is utilized to compact a part 'B' out of powder material with an undercut 68 or 70 in a press 80. The press 80 is well known to those persons skilled in the art and includes an upper ram 82, lower ram 84 and press table 86 which is fixed relative the frame 88 of the press 80.

FIG. 1 illustrates the device, toolset 20, which includes the top or upper die being die 40 of second die and punch set 24, a top or upper punch being punch 42 of second die and punch set 24, a bottom or lower die being die 26 of first die and punch set 22, and two bottom or lower punches being first and second punches 28 and 30 of first die and punch set 22.

The top die 40 has a drive system 90 which may comprise a hydraulic cylinder mounted to the upper ram 82 of a press 80. Accordingly, the top die is moveable relative the upper ram by means of the drive system 90. The top punch, being punch 40, is mounted on the upper ram 82 while the bottom die, being die 26, is driven by the lower ram 84 of the press 80. Moreover, at least one of the bottom punches shown in FIG. 4 as first punch 28 of first die and punch set 22, has a drive system which may consist of a hydraulic cylinder 92 mounted stationary relative to the frame 88 of the press 80.

The upper punch is associated with the upper die. In particular, the upper die has a hole, being opening 44, for receiving the upper punch for slidable relative motion therebetween.

The lower punches are mounted for relative slidable movement with the lower die. In particular, the lower die includes a hole, being opening 36, to receive punches 30 and 28 for relative slidable movement therebetween. Furthermore, punch 30 includes a hole, being opening 38, for slidably receiving punch 28. Punch 28 moves relative to punch 30 between the lowest position shown in FIG. 1a and the closed position shown in FIG. 1b. First chamber 46 includes a volume, being portion 48, which is defined by the volume displaced during the slidable relative movement of punch 28 relative to punch 30 from the position shown in FIG. 1b to that shown in FIG. 1a.

The upper die and lower die are adapted for relative movement between an open position as illustrated in FIG. 1a and a closed position as shown in FIG. 1b. In the open position, a feed box (not shown) moves over first chamber 46. In the position shown in FIG. 1a, first chamber 46 is defined by the space between die 26 and punches 30 and 28 when punch 30 is in its lowest position relative to die 26, and where the other punch 28 is in its lowest position relative to punch 30 as shown in FIG. 1a. The punch 28 is moved far enough down or in its lowest position that enough powder 'A' can be stored for the compaction of the part 'B'.

After filling of first chamber 46 the upper ram is moved down until the upper die is touching the lower die as shown in FIG. 1b for sealing of closed mould cavity 60. The lower die and lower punch 30 have not moved between the positions shown in FIG. 1a and 1b, as noted above.

Figure 4:
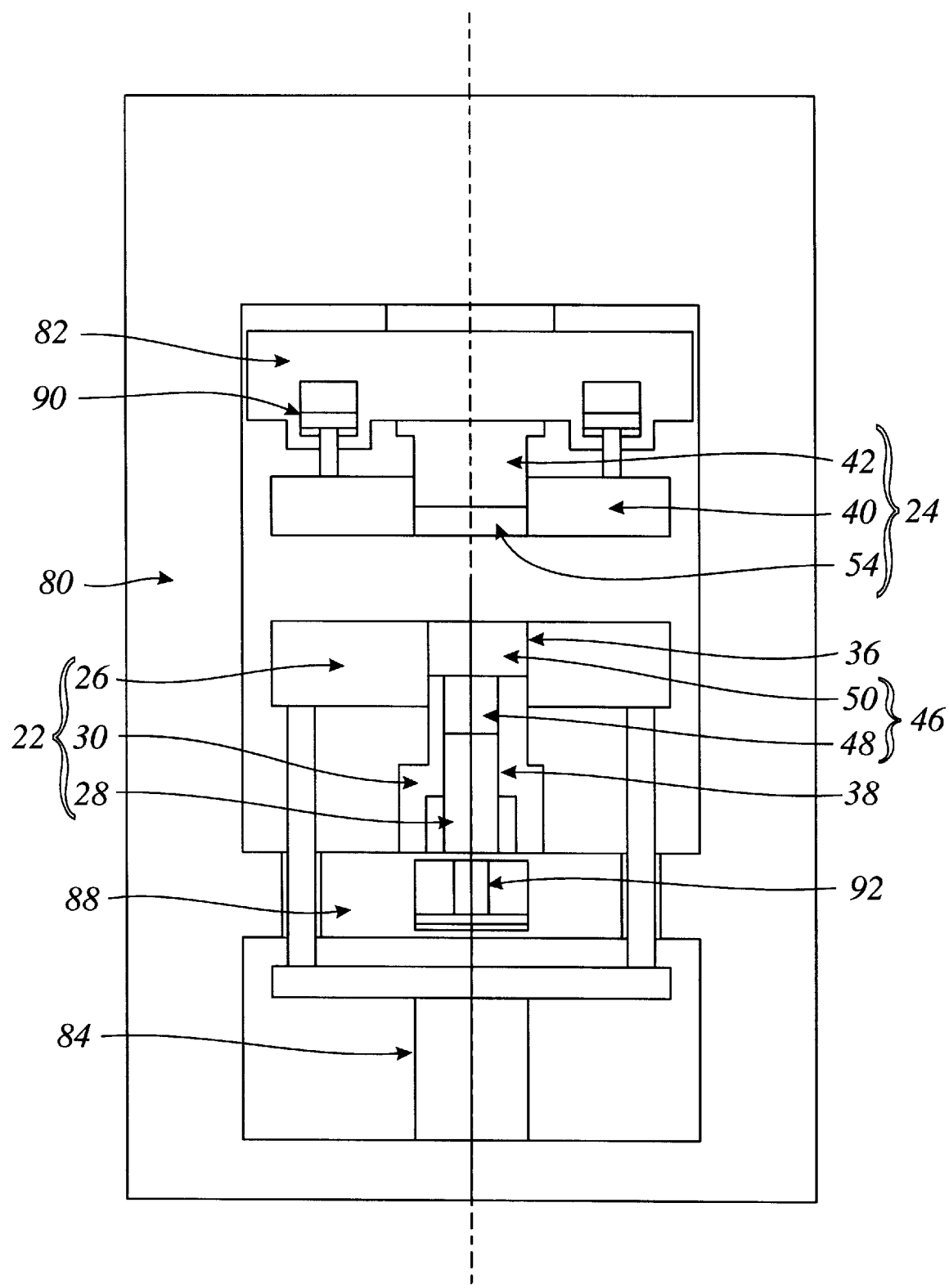
FIG. 4 is a front elevational view of the press.

Thereafter the moveable punch 28 travels upward to transfer the powder 'A' from the first portion 48 of first chamber 46 into second chamber 54 in die 40 of second die and punch set 24. Second chamber 54 is defined by the upper die and upper punch. The upper die moves relative to the upper punch by means of the hydraulic cylinder 90 as best shown in FIG. 4.

FIG. 1b illustrates that second chamber 54 is offset from first chamber 46 in a direction perpendicular to the movement of the upper die relative the lower die (in other words the compaction direction), so as to produce said part 'A' with an undercut 68 or 70.

The compaction is shown in FIG. 1c and is accomplished by moving the upper ram 82 and both dies 26 and 40 with a suitable speed relationship downward. After compaction the part is ejected by withdrawing the top die upward and the lower die downward as shown in FIG. 1d.

It is possible to also have a stationary bottom die if the bottom punches are mounted to the lower ram of the press and are used for counter pressing and ejection.

FIG. 1d shows the ejection of the part 'B' when the dies 26 and 40 are in an eject position. The part 'B' has an undercut 68 or 70.

Figure 2:
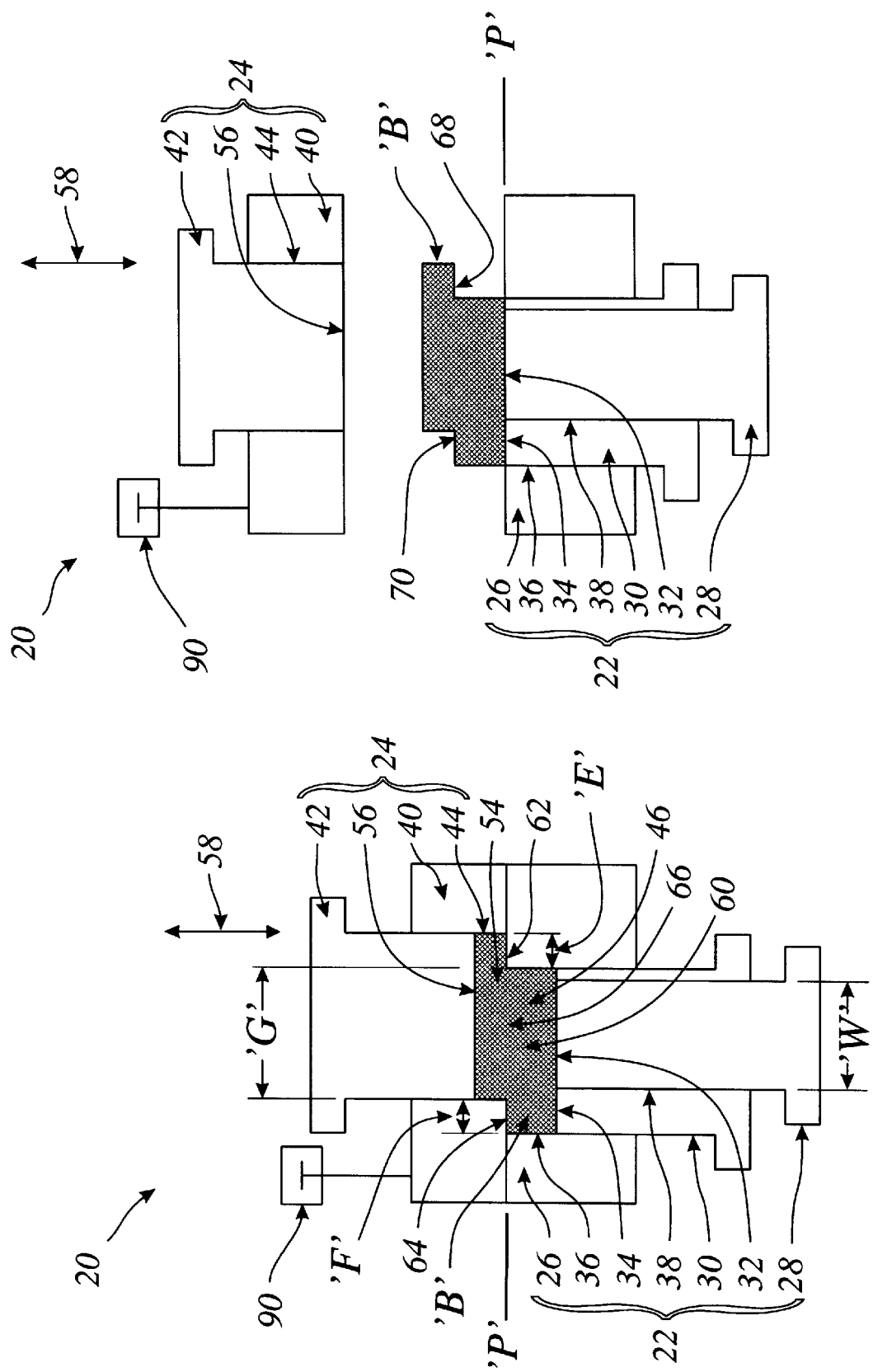
FIG. 2 is a representative view of the toolset of FIG. 1c in a position for making a compacted part having different levels on the lower surface.

The embodiment illustrated in FIGS. 1a through 1d shows the compaction of a single level part 'B' with an undercut 68 or 70. The invention is not limited thereto but can also be used for multi-level parts with an undercut by introducing necessary additional top and bottom punches. For example, FIG. 2 illustrates a part 'B' having multiple levels which is created by the each of punches 36 and 28 being at different levels. In such case the device and method shown herein is more advantageous since the bottom punch which transfers the powder into the top die can at the same time form one of the bottom levels of the part.

Figure 3:
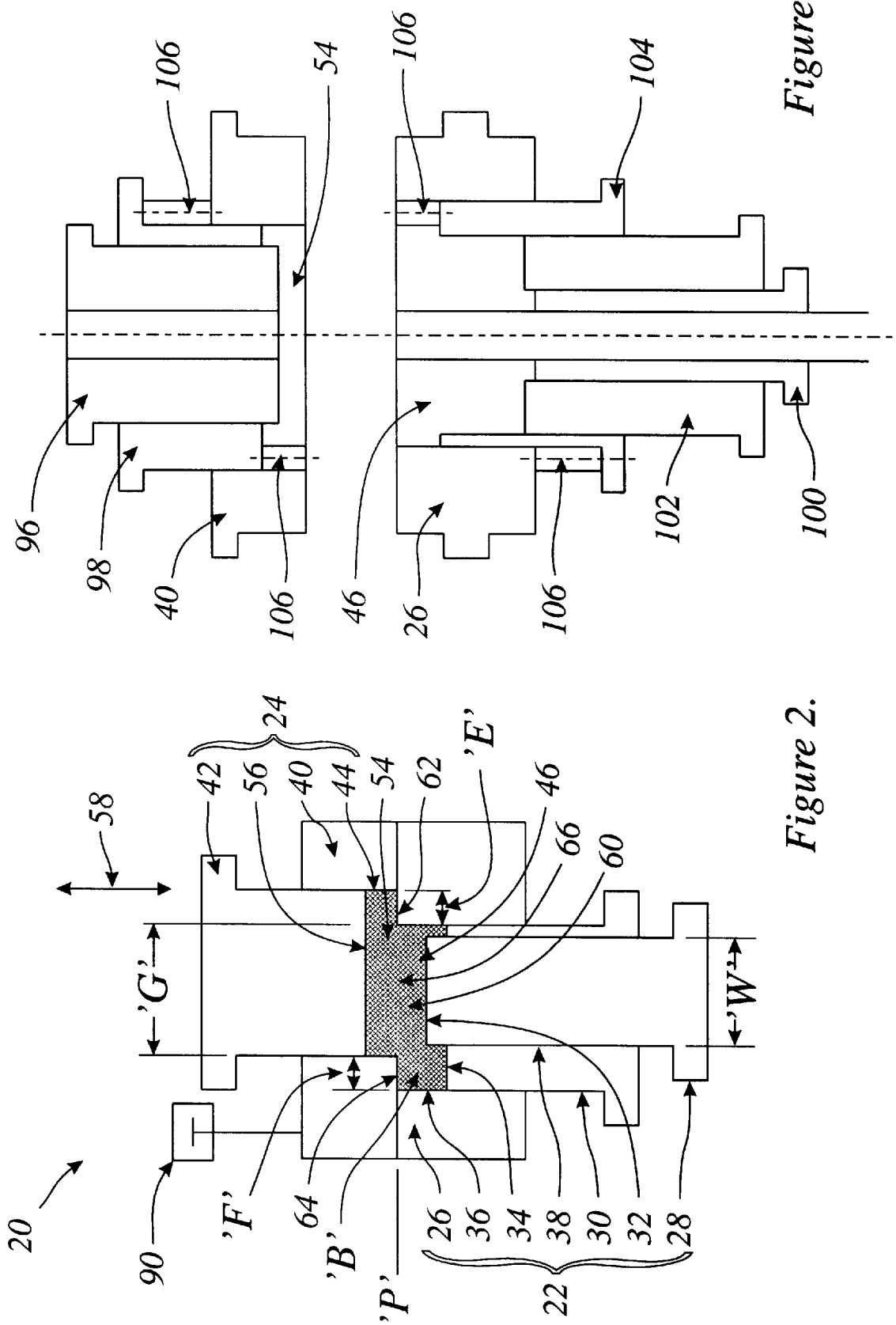
FIG. 3 is a schematic view of another embodiment of the invention showing the various two upper and three lower punches.

FIG. 3 illustrates another embodiment of the invention having several upper punches 96 and 98. Upper punch 98 could be stationary and upper punch 96 could be moved by suitable hydraulic cylinders. Moveover, FIG. 3 illustrates several lower punches 100, 102 and 104. Numeral 106 shows the pitch diameter of the tooth form within the punches and respective dies.

In order to conduct all necessary movements during the cycle with suitable precision and speeds and timing, a hydraulic press with closed loop controls is preferably used, although the invention is not limited thereto.

The drawings illustrate the withdrawal principal which means that after compaction the lower die is withdrawn to eject the part. However the invention described herein is also applicable for the counterpressing principle in which case the bottom die is stationary relative the press and all the bottom punches are mounted to the lower ram (including the drives to achieve relative movements between the bottom punches, if more than one bottom punch), so that after compaction the bottom punches will be moved further through the bottom die by the lower ram in order to eject the part.

Although the preferred embodiment as well as the operation and use have been specifically described in relation to the drawings, it should be understood that variations in the preferred embodiment could be achieved by a person skilled in the trade without departing from the spirit of the invention as claimed herein.

We claim:

1. A toolset for a powder molding machine comprising a pair of opposed die and punch sets each having a die and a punch co-operating therewith to define respective chambers, said sets being movable relative to one another from an open position in which said sets are separated, to a closed position in which said chambers are in closed communication to form a closed mold cavity, one of said punches being movable from a filling position, in which said respective chamber has a volume sufficient to receive a charge of powder to fill said mold cavity, to a transfer position in which said respective chamber has a reduced volume, movement of said punch between said filling and said transfer positions thereby transferring powder to the other of said chambers to fill said closed cavity.

2. A toolset as claimed in claim 1 wherein one of said die and punch sets includes two punches, and a die said die including an opening for slidably receiving said punches for relative movement therebetween.

3. A toolset as claimed in claim 1 wherein one of said punches includes an opening for slidably receiving the other punch for relative movement therebetween.

4. A toolset as claimed in claim 1 wherein movement of said one punch from said filling position to said transfer position displaces a volume of powder corresponding substantially to the volume of said other chamber associated with the other punch and die set thereto when said dies are in said closed position.

5. A toolset as claimed in claim 1 wherein at least one of said pair of die and punch sets has a plurality of punches nested within a die; each of said plurality of punches having an end for contacting the charge of powder; and each of said ends being movable to contact said powder material at different levels to produce a compacted part having different levels.

6. A toolset as claimed in claim 5 wherein the other of said pair of die and punch sets includes more than one punch, said one of said pair of die and punch sets includes more than two punches, and each of said punches are movable to respective spaced locations in said cavity to form a multi-level compacted part.

7. The toolset of claim 1 wherein in said closed position a punch of at least one of said die and punch sets is movable relative to its die to a compaction position to compress said charge in said cavity.

8. The toolset of claim 2 wherein a first punch of said one set is movable relative to said first die and relative to said second punch to transfer said powder.

9. The toolset of claim 1 wherein said dies and punches of said pair of die and punch sets are further movable to a compaction position and an ejection position, and, in each of said filling, transfer, compaction, and ejection positions each of said punches is in sliding engagement within said die with which it is co-operating.

10. The toolset of claim 1 wherein said die and punch sets are relatively movable along an axis of reciprocation, and one of said chambers is displaced in a direction transverse to said axis relative to the other of said chambers.

11. The toolset of claim 10 wherein in said closed position a punch of at least one of said die and punch sets is movable relative to its die to a compaction position.

12. The toolset of claim 10 wherein one of said die and punch sets includes two punches, and a die, said die including an opening for slidably receiving said punches for relative movement.

13. The toolset of claim 12 wherein one of said punches of said first die and punch set is movable relative to the other punch and said die to transfer said powder.

14. A toolset as claimed in claim 12 wherein displacement of said one punch from said filling position to said transfer position displaces a volume of powder corresponding substantially to the volume of said chamber associated with the other of said punch and die sets.

15. A toolset as claimed in claim 10 wherein each of said punches of said one punch and die set has an end for contacting the charge of powder; and each of said ends is movable to spaced locations within said cavity to contact said powder material at a different locations, whereby a compacted part having a stepped surface is produced.

16. A toolset as claimed in claim 15 wherein each of said die and punch sets includes more than one punch, said punches being movable to respective spaced locations within said cavity to form stepped surfaces for said part.

17. The toolset of claim 10 wherein said die and punch sets are movable from said transfer position to a compaction position and an ejection position, and, in each of said filling, transfer, compaction, and ejection positions each of said punches is slidably associated with respective ones of said dies.

18. The press of claim 17 wherein said other punch and die set includes a pair of punches, one of which is connected to said hydraulic motor and the other of which is connected to said frame.

19. A press for compacting parts out of powder material said press having a frame, a pair of opposed rams and a toolset operatively associated with said rams, said press comprising:
 (a) a pair of die and punch sets movable relative to one another between an open position, a closed position and an eject position;
 (b) a drive for controlling relative movement between said punch and die sets;
 (c) each of said punch and die sets including at least one punch associated with a die for relative movement therebetween, said punch and die cooperating to define a respective chamber;
 (d) a drive member associated with each of said sets for controlling relative movement between respective ones of said die and said punch;
 (e) said punch and die of one of said sets providing a chamber for filling with said powder material when said die sets are in said open position;
 (f) said drive member associated with said one set being operable in said closed position in which said chambers cooperate to define a closed mold cavity to move said punch of said one set towards said die of the other of said sets so as to transfer said powder material toward said die of said other set, said drive members being operable to cause relative movement of said punches to compact said powder material between said punches with said dies in said closed position so as to produce said compacted part; and
 (g) said die sets being movable to said eject position for ejection of said compacted part.

20. A press as claimed in claim 19 wherein one of said punches of one of said sets is mounted to one of said rams, and wherein said drive member associated therewith comprises a hydraulic motor operable between said one ram and said die of said one set for movement of said die relative said punch.

21. A press as claimed in claim 20 wherein said die of said other of said sets is mounted to the other of said rams.

22. A press as claimed in claim 21 wherein said drive member associated with said other of said sets includes a hydraulic motor operable between said frame and said punch of said other set.

23. A device to compact parts out of powder material comprising a tool set in a press having an upper die, a lower die, at least one upper punch associated with said upper die, and at least two lower punches associated with said lower die; said device having at least a first drive system for moving said lower punches in slidable engagement within and relative to, said lower die; said first drive system movable to a first position to locate one of said lower punches within said lower die to define a lower cavity for receiving powder material;
 said upper die being mounted with a second drive system to an upper ram of said press, and movable by said second drive system;
 said device having a third drive system for moving said upper punch in sliding engagement within, and relative to, said upper die; said upper punch movable to a position within said upper die to define an upper cavity;
 said upper ram being movable to position said upper die against said lower die to close said lower cavity;
 said first drive system being movable to move one of said lower punches upwardly toward said upper die to transfer a portion of said powder material from said lower cavity to said upper cavity;
 said second drive system being movable to move said upper die upwardly to permit ejection of a compacted part.

24. A method for making compacted powder parts with a toolset including a pair of die and punch sets each having a die and an associated punch engageable therewithin to define respective chambers, said method comprising the sequential steps of:
 (a) establishing the tool set in a filled position in which said chambers are in closed communication to define a mold cavity with a charge of powder captured therein;
 (b) moving one of said punches relative to its die to transfer at least a portion of the charge of powder from one of said chambers to the other of said chambers;
 (c) compacting the charge of powder to form a part; and
 (d) ejecting said part.

25. The method of claim 24 including the steps of:

(i) positioning said die and punch sets in an open position and locating one of said punches within its associated die to define a chamber for receiving the charge of powder having a volume corresponding to the volume of said charge of powder;

(ii) filling said one of said respective chambers with the charge of powder; and (iii) moving said die and punch sets together to establish said tool set in said filled position.

26. A method according to claim 25 wherein one of said die and punch sets includes a pair of punches and said method includes the step of moving one punch relative to the other to transfer said charge.

27. A method according to claim 26 including the step of moving said die of said one set relative to both said punches to compact said charge.

28. A method according to claim 27 including the step of positioning said punches of said one set at relatively spaced locations in said chamber.

29. A method according to claim 25 wherein each of said punches is maintained in sliding association with respective ones of said dies from said open position to ejection of said part.

* * * * *